United States Patent
Grzybowski et al.

(10) Patent No.: US 8,397,537 B2
(45) Date of Patent: *Mar. 19, 2013

(54) METHOD FOR LOCAL REVERSIBLE GLASS SWELLING

(75) Inventors: Richard R Grzybowski, Corning, NY (US); Alexander Mikhailovich Streltsov, Corning, NY (US); James Scott Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 501 days.

This patent is subject to a terminal disclaimer.

(21) Appl. No.: 12/669,381

(22) PCT Filed: Jul. 16, 2007

(86) PCT No.: PCT/US2007/016097
§ 371 (c)(1),
(2), (4) Date: Jan. 15, 2010

(87) PCT Pub. No.: WO2009/011675
PCT Pub. Date: Jan. 22, 2009

(65) Prior Publication Data
US 2010/0183846 A1 Jul. 22, 2010

(51) Int. Cl.
*C03B 23/02* (2006.01)
*B23K 26/02* (2006.01)
*B23K 26/00* (2006.01)

(52) U.S. Cl. ... 65/106; 65/29.12; 65/29.18; 219/121.62; 219/121.66; 219/121.83

(58) Field of Classification Search .................... None
See application file for complete search history.

(56) References Cited

U.S. PATENT DOCUMENTS

| 5,586,040 | A | * | 12/1996 | Baumgart et al. | ............. 700/166 |
| 5,604,635 | A | * | 2/1997 | Lawandy | ....................... 359/620 |
| 5,631,408 | A | * | 5/1997 | Baumgart et al. | ............. 73/1.81 |
| 5,665,136 | A | * | 9/1997 | Komachi | ......................... 65/102 |
| 5,863,473 | A | * | 1/1999 | Ohsawa et al. | .............. 264/1.33 |

(Continued)

FOREIGN PATENT DOCUMENTS

| CN | 1167315 | 12/1997 |
| WO | 99/08867 | 2/1999 |

OTHER PUBLICATIONS

Machine Translation of CN1167315.

(Continued)

*Primary Examiner* — Jason L. Lazorcik
(74) *Attorney, Agent, or Firm* — Michael W. Russell (57) ABSTRACT

A method of forming, on the surface of a glass material, a raised feature having a height within a target range, comprising (1) providing a glass material having a surface, (2) providing the glass material locally, at a location at or below the surface, with an amount of energy causing local expansion of the glass material so as to raise a feature on the surface at the location, (3) detecting the height of the raised feature or the height over time of the raised feature, (4) (*a*) if the height is below or approaching a value below the target range, providing the glass material at the location with energy in a greater amount, or (*b*) if the height is above or approaching a value above the target range, providing the glass material at the location with energy in a lesser amount, and (5) repeating steps (3) and (4) as needed to bring the height within the target range. Methods and devices for automating this process are also disclosed.

11 Claims, 5 Drawing Sheets

U.S. PATENT DOCUMENTS

| | | | | |
|---|---|---|---|---|
| 5,951,891 | A * | 9/1999 | Barenboim et al. | 219/121.68 |
| 6,091,047 | A * | 7/2000 | Miyakawa et al. | 219/121.68 |
| 6,204,474 | B1 * | 3/2001 | Xuan | 219/121.77 |
| 6,207,926 | B1 * | 3/2001 | Xuan | 219/121.68 |
| 6,287,663 | B1 * | 9/2001 | Goto | 428/846.3 |
| 6,388,229 | B1 * | 5/2002 | Baumgart et al. | 219/121.62 |
| 6,785,221 | B2 * | 8/2004 | Wilkinson et al. | 369/275.4 |
| 7,152,434 | B2 * | 12/2006 | Hashimoto et al. | 65/392 |
| 2003/0209040 | A1 | 11/2003 | Hashimoto et al. | |
| 2005/0013048 | A1 * | 1/2005 | Yamamoto et al. | 360/135 |

OTHER PUBLICATIONS

Taiwanese Patent Application No. 097126876 Search Report.

* cited by examiner

METHOD FOR LOCAL REVERSIBLE GLASS SWELLING

This invention was made with Government support under Agreement No. H98230-05-C-0429 awarded by Maryland Procurement. The U.S. Government has certain rights in this invention.

BACKGROUND

This invention relates to surface texturing of glass materials and specifically to surface texturing of glass materials induced by locally applied energy. Such texturing may include making bumps, ridges, and all variety of more complex surface features resulting from combinations of these.

The effect of glass swelling when locally irradiated with a laser is known. Small bumps, less than a few micrometers, formed by heating a glass surface with a $CO_2$ laser, have been reported, such as in U.S. Pat. No. 5,567,484, "Process for Texturing Brittle Nonmetallic Surfaces" (1996). Raising larger bumps into shapes defined by an overlying mold has also been reported, such as in U.S. Pat. No. 7,152,434, "Method for Producing Planar Lens and Planar Lens Array" (2006). It would be desirable to be able to raise bumps on a glass surface to significant heights, such as beyond a few micrometers or even as great as 100 micrometers or more, but with fine reproducibility and control of the height such as control as tight as ±100 nanometers, without being limited to the form or shape of a particular mold surface.

SUMMARY OF THE INVENTION

According to one aspect of the present invention, the invention includes a method of forming, on the surface of a glass material, a raised feature having a height within a target range. The method comprises (1) providing a glass material having a surface, (2) providing the glass material locally, at a location at or below the surface, with an amount of energy causing local expansion of the glass material so as to raise a feature on the surface at the location, (3) detecting the height of the raised feature or the height over time of the raised feature, (4)(a) if the height is below or approaching a value below the target range, providing the glass material at the location with energy in a greater amount, or (b) if the height is above or approaching a value above the target range, providing the glass material at the location with energy in a lesser amount, and (5) repeating steps (3) and (4) as needed to bring the height within the target range. According to another aspect of present invention, methods and devices for automating this process are also disclosed.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiments of the invention, example of which are illustrated in the accompanying drawings. Whenever possible, the same reference numerals will be used throughout the drawings to refer to the same or like parts.

Figure 1:
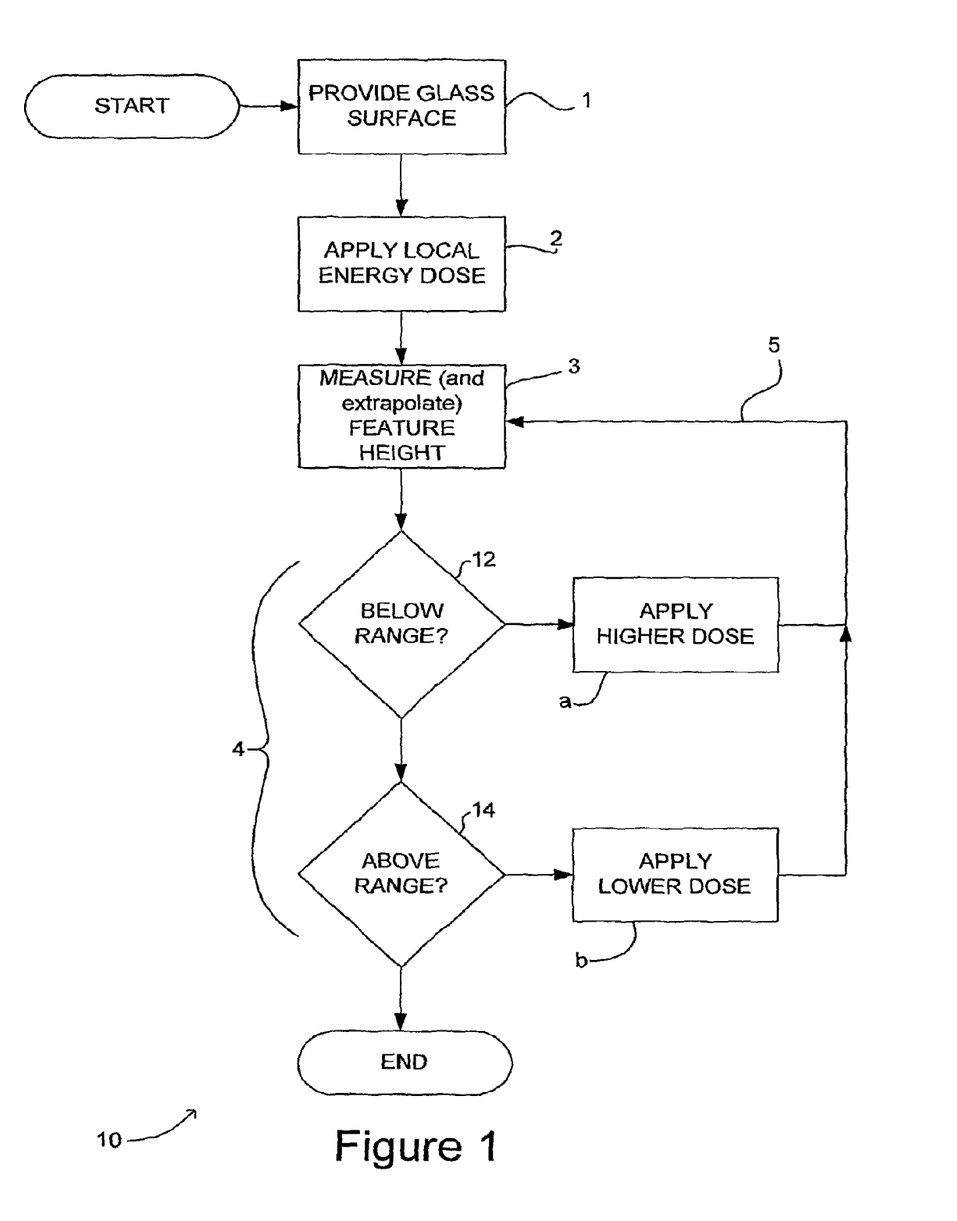
FIG. 1 is a flow diagram of certain aspects of a method according to the present invention.

One embodiment of the method or process of the present invention is illustrated in the flow diagram of FIG. 1. This method allows the forming, on the surface of a glass material, of a raised feature or multiple such features having a height within a target range. Such raised features may include simple bumps, but also ridges and all variety of more complex surface features resulting from combinations of these.

As may be seen in FIG. 1, the method 10 of the present invention generally includes a step 1 of providing a glass material having a surface followed by a step 2 of applying a local energy dose, at a location at or below the surface, with an amount of energy causing a local expansion of the glass material so as to raise a feature on the surface. Next, in a step 3, the height of the raised feature is measured or detected, and optionally, if continuous energy dosing is used, the height being approached is extrapolated. In a step 4, the measured or detected or extrapolated height is compared to the target range as represented by the decision diamonds 12 and 14. If the current height, or the height being approached, is below the target range then the glass material is provided with energy in a greater amount, as represented in part a of step 4. If the current height, or the height being approached, is above the target range then the glass material is provided with energy in a lesser amount, as represented in part b of step 4. As a final step in the form of a repeat loop 5, steps 3 and 4 are repeated as needed to bring the height within the target range.

Figure 2:
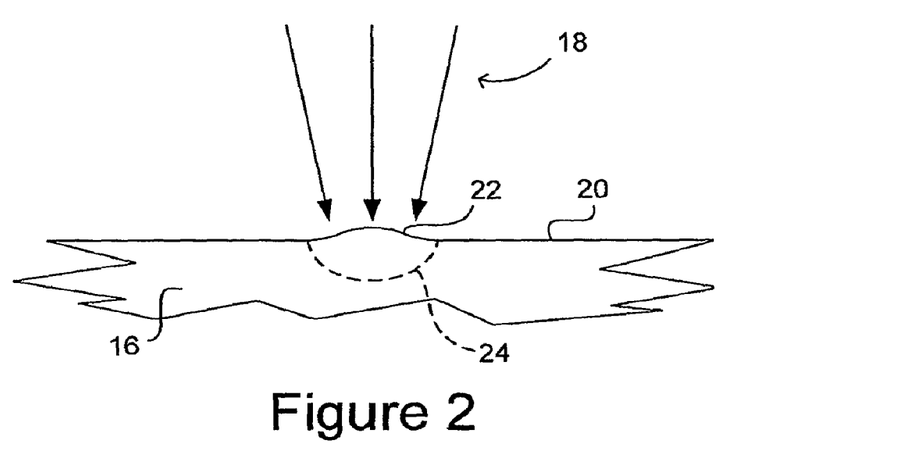
FIG. 2 is a diagrammatic cross-sectional view of a glass surface being textured by electromagnetic radiation.

The presently preferred means of supplying the energy used in the method of FIG. 1 is shown in FIG. 2. In FIG. 2, a glass material 16 is shown being irradiated on a surface 20 thereof by radiation 18. The radiation is desirably from a laser beam or other electromagnetic source capable of producing an irradiated spot size on the order of 0.2-0.5 millimeters. A focused or unfocused laser may be used, as may other sufficiently high intensity sources, whether coherent or not, if they are focused and/or masked down to a sufficiently small spot size. Frequencies other than visible and infrared, such as microwave, may potentially be of use. What is generally required is a sufficiently small spot size, together with sufficiently high power, and sufficiently absorptive glass material, such that an amount of energy is deposited in a small enough volume 24, so that a bump or other surface feature 22 is raised and stays in place when the radiation is removed. Some care must be taken to appropriately match the absorption of the glass with the wavelength of radiation used. Highest absorption is not always preferred, however, as deeper penetration of the radiation, with a consequently deeper heating zone, tends to allow greater feature heights.

Figure 3:
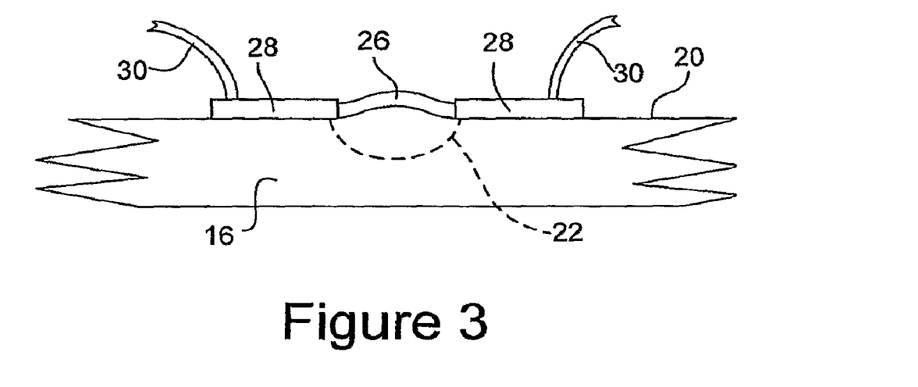
FIG. 3 is a diagrammatic cross-sectional view of a glass surface being textured by a surface-disposed energy concentrating element.

One alternative method of providing the energy used in the method of FIG. 1 is shown in FIG. 3. In FIG. 3, a surface energy concentrator in the form of a heating element 26 is positioned on the surface 20, and supplied with energy, such as an electrical current from surface leads 28 and bonded wires 30.

Figure 4:
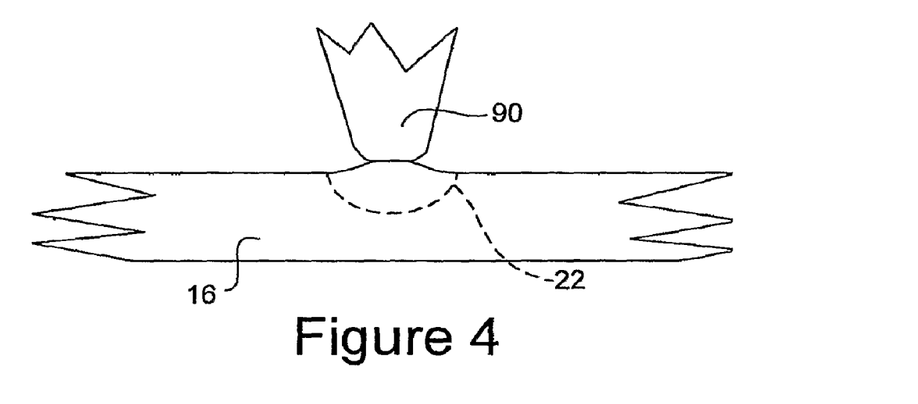
FIG. 4 is a diagrammatic cross-sectional view of a glass surface being textured by a probe tip.

As another alternative method of providing the energy of the method of FIG. 1 is shown in FIG. 4. In FIG. 4, an energy delivering probe in the form of a vibrating or rotating friction probe 90 heats the surface of the glass material 16.

According to one embodiment of the method of the present invention, the steps shown in FIG. 1 are performed continuously, that is, the applications of energy in steps 2 and 4 of FIG. 1 need not be discrete events, but energy may be applied essentially continuously until a height within a given target range is reached. Thus, in this embodiment, providing the glass material locally, at a location at or below the surface, with an amount of energy, and providing the glass material with energy in a greater amount, and providing the glass material with energy in a lesser amount, together comprise providing the glass material with a varying but continuous dose of energy.

An alternative is providing discrete doses of energy in steps 2 and 4 of FIG. 1. In this embodiment, providing the glass material locally, at a location at or below the surface, with an amount of energy, and providing the glass material with energy in a greater amount, and providing the glass material at the location with energy in a lesser amount, each comprise providing the glass material with a discrete dose of energy.

Of course these two alternatives may also be mixed such that discrete doses are sometimes used and continuous doses are sometimes used, if desired.

The methods of the present invention offer the ability to create raised features on the surface of a glass material having heights 10, 50, or even 100-200 micrometers or greater. Bumps have even been produced as great as 250 micrometers in height. The method of the present invention also offers the ability to reliably achieve heights within target ranges as narrow as plus or minus 500, 200, and even 100 nanometers (nm). Producing features of 100 micrometers height to within ±100 nanometers represents a maximum variation in height of only one-half of one percent.

Figure 5:
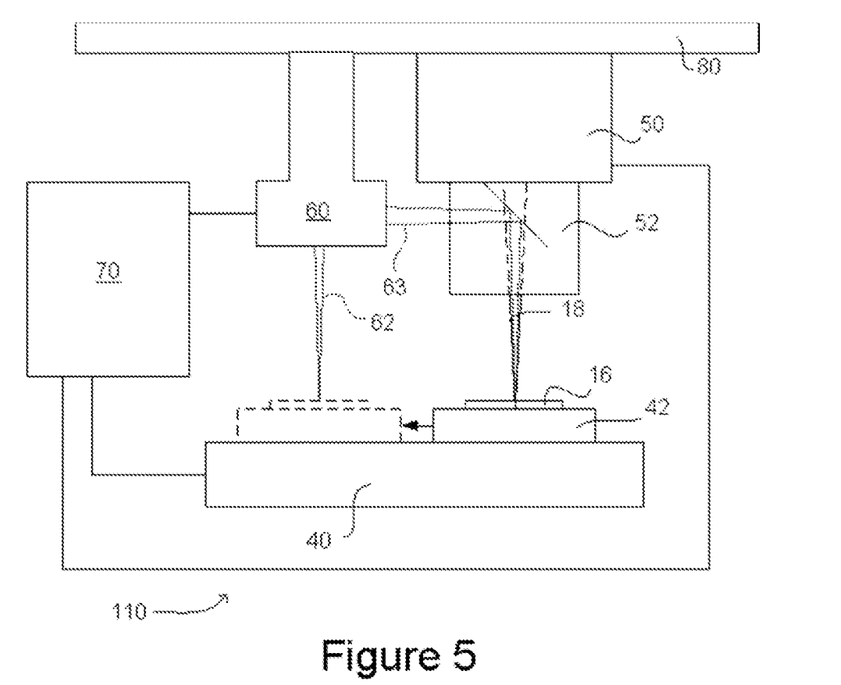
FIG. 5 is a schematic diagram of a system or device for carrying out and automating the method of the present invention.

As another aspect of the present invention, the method of claim 1 may be automated, if desired. An example of a system 110 for automatically surface-texturing an article of glass material is shown in FIG. 5. An x-y moveable stage device 40 includes a moveable stage 42 upon which an article of glass material 16 is placed. A controller 70, which may be anything from one or more items of dedicated circuitry or small microcontrollers, up to a dedicated computer or a portion of a factory control system, includes storage for, or has access to, information relating to one or more glass material's behavior under influence of one or more types of energy, desirably laser energy as the presently preferred embodiment. The controller 70 also stores or has access to the raised feature or pattern of raised features to be formed. The controller 70 uses the information, such as by a software or hardware estimating algorithm, one or more look-up tables, or suitable substitutes therefor, to choose the initial energy and irradiation time based on the target range. Generally, that amount of energy which is most likely to achieve a feature height in the center of the target range is selected, although particular glass materials may call for aiming initially to the high or low side of center, if the target is easier to approach from a particular side for a particular material or a particular feature height. The controller also signals the stage device 40 to position the stage 42 and glass material 16 so as to create the desired feature at the desired location on the surface of material 16.

When the glass material is in the desired position, controller 70 signals a laser device 50 to impart the chosen amount of energy via the beam 18. Energies on the order of 1-10 Joules delivered in a time period on the order of 0.1 to 2 seconds are believed generally appropriate, although times as long as 5 or 10 seconds have also succeeded in testing. As described above, the localized energy input causes the raising a surface feature. If discrete energy doses are used, the raised portion becomes fixed in its raised state, very soon after the irradiation of the glass material 16 ends.

Whether discrete or continuous energy doses are used, the feature height is then measured by a measuring device 60, such as an optical profilometer using a scanning measuring beam 62. For facilitating this measurement in the case of discrete energy doses, stage device 40 may move the state 42 to the position shown in dashed outline in the figure. Alternatively, the measuring device may be positioned closely to, or may even be incorporated into, the optical system 52 of the laser device 50, as shown by the alternate measurement beam 63, or may be otherwise directed toward the glass material in its first position, so that no movement of the stage 42 is necessary. The optical system 52 of the laser device 50 may even include beam steering capability, such that no moveable stage 42 or moveable stage device 40 is required, even for formation of complex raised features, in automated system 110. In the absence of more typical beam steering, the laser itself 10 or relevant a portion thereof may be moveable on mounting structure 80, as may be the measuring device 60, such that even without beam steering, no moveable stage need be used. Use of a measurement system that operates concurrently with the irradiation beam 18 allows for use of continuous energy doses to more quickly reach targeted ranges.

After determining whether the measured height is above or below target, a new energy amount is selected by the controller, in accord with the method of FIG. 1, and the steps of irradiating and measuring are repeated. It is preferred that the time of irradiation is kept the same, while the dose is varied. Where continuous energy doses are used, the controller is preferably programmed to take account of the growth trends of the raised features as they are raised, such that not just the height, but the height over time of the raised features is measured and recorded or reflected within the controller's memory functions, such that the controller functions to extrapolate the final height being approached with a given dose energy. In the continuous dose embodiment, if the height is approaching a value below the target range, then the glass material is provided with energy in a greater amount, and if the height is approaching a value above the target range, then the glass material is provided with energy in a lesser amount.

EXPERIMENTAL

Glass compositions for which reasonably tall bumps have been achieved at a wavelength of 810 nm, and for composition 3 also for 1550 nm, are listed in Table I below. The 1550 nm wavelength is desirable in order to fabricate bumps on glass that is covered with substrate like silicon, which is transparent at that wavelength. This is a principal wavelength produced by a 1.5-μm erbium fiber laser. Using this form of laser, the capability to both increase and decrease bump heights has been demonstrated.

TABLE I

| | | Composition Number | | |
|---|---|---|---|---|
| | | 1 | 2 | 3 |
| Oxides, Composition (Mol %) | $SiO_2$ | 79.84 | 78.84 | 78.34 |
| | $B_2O_3$ | 10.56 | 10.56 | 10.56 |
| | $Al_2O_3$ | 1.21 | 1.21 | 1.21 |
| | $Na_2O$ | 5.38 | 5.38 | 5.38 |
| | $Fe_2O_3$ | 1 | 0 | 1.5 |
| | $TiO_2$ | 2 | 2 | 3 |
| | $K_2O$ | 0 | 0 | 0 |
| | $CuO$ | 0 | 0 | 0 |
| | $CeO_2$ | 0 | 2 | 0 |
| Optical density in $log_{10}$, @1 mm thickness | @ 810 nm | 1.67 | 0.07 | 4.15 |
| | @ 1550 nm | 0.72 | — | 2.73 |
| Max. bump height, in um, @ pulse energy, in J. | @ 810 nm | 111/9.7 | 196/27.3 | 70/6.7 |
| | @ 1550 nm | — | — | 250/25 |

Figure 6:
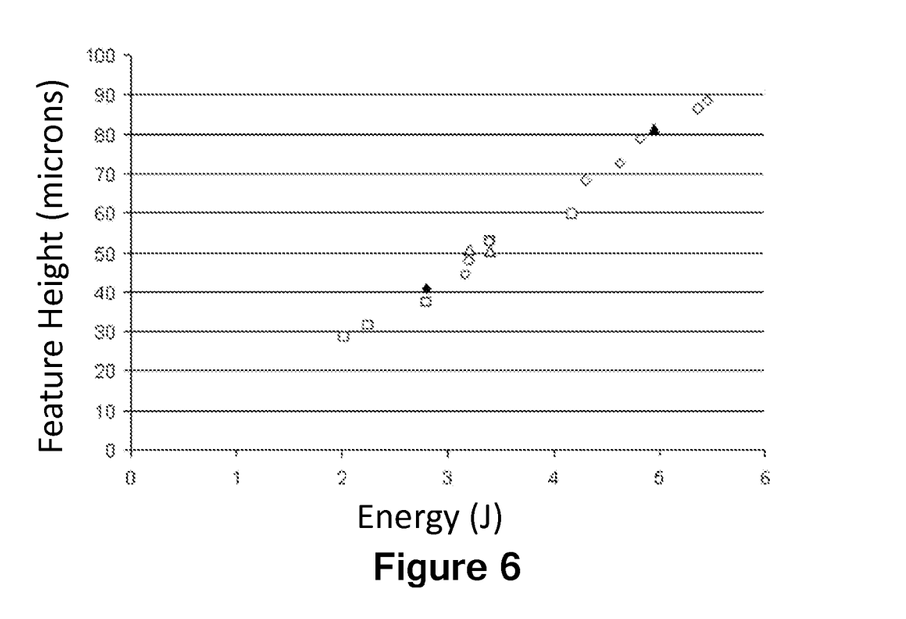
FIG. 6 is a graph of experimental results of glass bump height in micrometers as a function of dose energy in Joules of a laser pulse.
Figure 7:
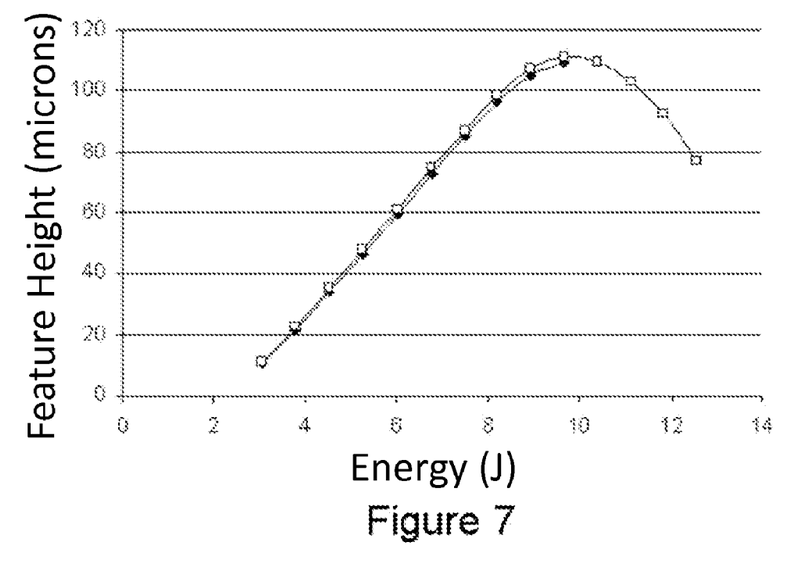
FIG. 7 is another graph of experimental results of glass bump height in micrometers as a function of dose energy in Joules of a laser pulse.

That bump or other feature height can be predicted reasonably well, as a function of laser pulse energy dose, is shown by the experimental results graphed in FIGS. 6 and 7. FIG. 6 shows bump heights in micrometers as a function of dose energy of a one-second laser pulse in Joules. The laser employed was an erbium-doped fiber laser at 1550 nm wavelength, and the glass composition was composition 3 of Table I above, with several different samples tested as shown by the various graph symbols. As may be seen from the figure, an essentially linear relationship was revealed, with small variation. FIG. 7 shows the another result for the relationship between the dose energy of an initial one second laser pulse, in Joules on the x axis and bump height in micrometers The light trace is one sample, and the dark trace another sample of the same material used in the tests of FIG. 6. A 1550 Laser output is also used. FIG. 7 shows and extremely linear relationship up to about 10 Joules, above which the initial height is not so great. It is presently preferred to stay within the initial linear portion of the curve of FIG. 7. Data like that shown in FIGS. 6 and 7 are clearly useful to automate the selection of the initial pulse energy.

The ability to both increase and decrease the height of bumps or other features is critical to reaching height values within a narrow target range. In the previous practice, with no way to easily or reliably decrease the height of a bump that is too high, an extremely uniform control of the energy source (laser or other) is required, along with extreme uniformity of the glass material itself, so that heights within narrow target ranges may be reliably obtained. Such high uniformity of glass material and such tight control of laser power are difficult.

Figure 8:
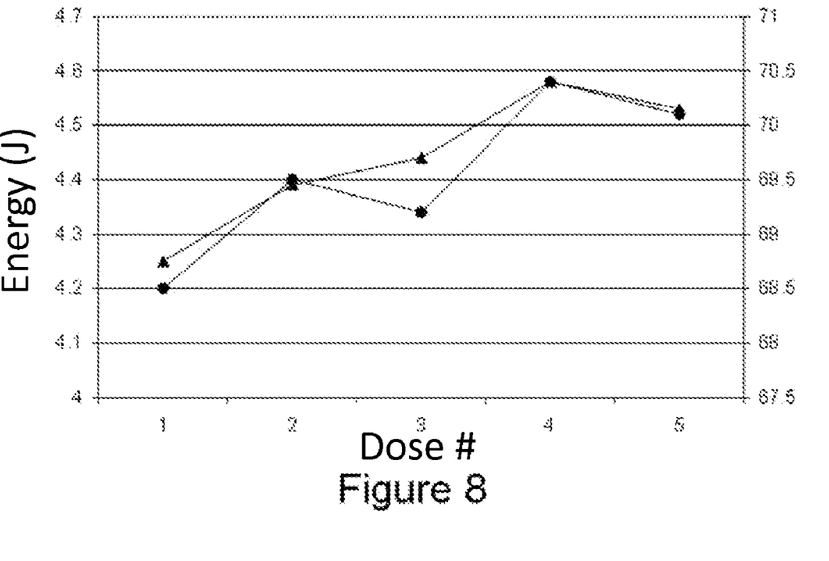
FIG. 8 is a graph of the dose energies and resulting feature heights for multiple laser pulses raising a feature to 70 micrometers±100 nanometers according to the methods of the present invention.
Figure 9:
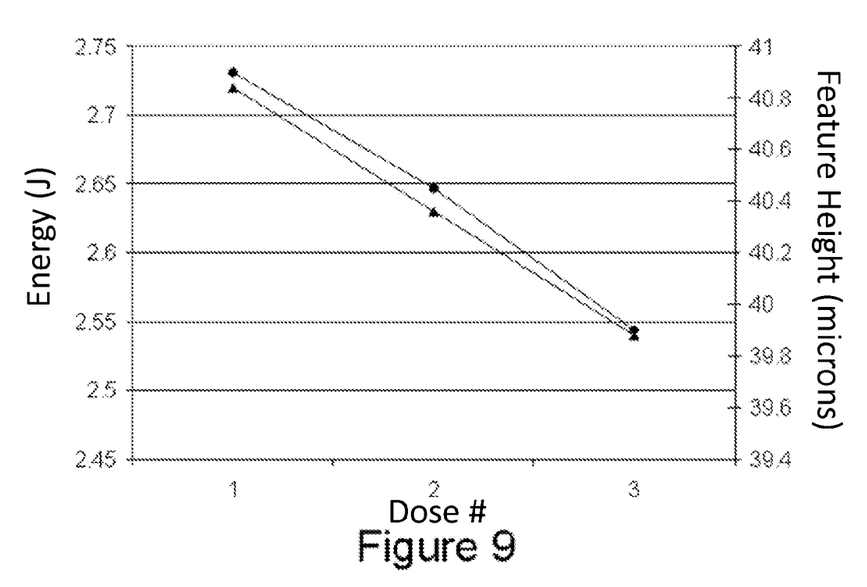
FIG. 9 is a graph of the dose energies and resulting feature heights for multiple laser pulses raising a feature to 40 micrometers±100 nanometers according to the methods of the present invention.

In contrast, in accordance with the present invention, the height of bumps or other features is adjusted, either up or down, as needed. FIGS. 8 and 9 show two experimental examples of the method of the present invention, applied to achieve bump heights of 30 μm and greater to within a target range of ±100 nm. Discrete energy doses were used. For each does, numbered on the x axis, dose energy is plotted as a triangle in Joules against the left axis, while resulting feature height is plotted as a circle in micrometers against the right axis.

Example 1

It was determined to raise a bump to a height of 70 μm±100 nm on a surface of a glass material corresponding to composition 3 of Table I, using 1510 nm radiation from an erbium-doped fiber laser. Relying on data like that in FIGS. 6 and 7, an initial dose energy of 4.25 watts was selected. The laser output was then focused on or a little under the glass surface into a 0.2-0.4 mm spot as 4.25 watts was irradiated over one second, forming an initial bump.

After the initial bump is formed, its height is measured with a laser profiler as shown in FIG. 4. The measurement revealed an achieved height of 68.5 μm—somewhat short of the desired height, as shown in FIG. 8. Since the height attained differed from the target value in that it was short by 1.5 μm, the adjustment process requires applying a higher energy pulse than that used in the first shot to increase the height. If this initial bump had overshot the target, it would have to be reduced by employing a lower energy pulse that that employed in the first shot.

Continuing with this example to trim (grow) the bump up to the desired height, a second shot of 4.39 J was administered, raising the bump height to ~69.5 μm—still 0.5 μm short of the target. A third 4.44 J shot was administered and in this example the height actually went down. This sometimes occurs when trimming due to variations in the linearity of the loser output power versus the setting. The energies listed are the projected ones based on the pump settings. In testing the laser pulse-to-pulse instability was around +/−5%. Hence, another shot was required. A 4.53 J pulse was administered which grew the bump to 70.1 μm, which was within +/−100 nm from the goal. This also demonstrates the ability of this process to take up some of the slack in the laser pulse-to-pulse instability. That is, a less precise laser with a +/−5% pulse-to-pulse instability can be used.

Example 2

A second example is represented by the data shown in FIG. 6, wherein the bump height target value was 40 μm. Again, looking at the data presented in FIGS. 6 and 7 helps guide the selection of laser pulse energy administered for the first shot. In this example a 2.72 Joule pulse was selected. This exposure resulted in a taller bump than desired −40.9 μm. Since the glass was produced in a small batch size, cord (inhomogeneities) is often observed. Again, the ability of the inventive process to tune bump heights up and down does not require high quality, homogeneous samples. Since the bump height was taller than desired, a subsequent dose of less energy than the first is required to trim the bump height down. A second pulse of 2.63 J trimmed the bump height down to ~40.45 μm. Finally, a third shot of 2.54 J brought the bump height to 39.9 μm, within the target height desired.

What is claimed is:

1. A method of forming, on the surface of a glass material, a raised feature having a height within a target range, the method comprising:
   (1) providing a glass material having a surface;
   (2) providing the glass material locally, at a location at or below the surface, with an amount of energy causing local expansion of the glass material so as to raise a feature on the surface at the location;

(3) detecting the height of the raised feature or the height over time of the raised feature; and (4)(*a*) if the height is below or approaching a value below the target range, providing the glass material at the location with energy in a greater amount, (*b*) if the height is above or approaching a value above the target range, providing the glass material at the location with energy in a lesser amount, (5) repeating steps (3) and (4) as needed to bring the height within the target range.

2. The method according to claim 1 wherein the height is at least 10 μm and the target range is equal to or less than ±500 nm of the height.

3. The method according to claim 1 wherein the target range is equal to or less than ±200 nm of the height.

4. The method according to claim 1 wherein the target range is equal to or less than ±100 nm of the height.

5. The method according to claim 1 wherein the height is at least 30 μm.

6. The method according to claim 1 wherein the height is at least 80 μm.

7. The method according to claim 1 wherein the dose of energy is supplied by one or more of: electromagnetic radiation and friction.

8. The method according claim 1 further comprising the step of automatically performing steps (2)-(5).

9. The method according to claim 1 wherein (1) providing the glass material locally, at a location at or below the surface, with an amount of energy, and providing the glass material at the location with energy in a greater amount, and providing the glass material at the location with energy in a lesser amount, together comprise providing the glass material with a varying but continuous dose of energy; or (2) providing the glass material locally, at a location at or below the surface, with an amount of energy, and providing the glass material at the location with energy in a greater amount, and providing the glass material at the location with energy in a lesser amount, each comprise providing the glass material with a discrete dose of energy.

10. The method according to claim 1 wherein providing the glass material with energy in a greater amount increases the height and providing the glass material with energy in a lesser amount decreases the height.

11. The method according to claim 1 comprising applying steps (4*a*) and (4*b*).

\* \* \* \* \*